US009065292B2

(12) United States Patent
Yazami

(10) Patent No.: US 9,065,292 B2
(45) Date of Patent: Jun. 23, 2015

(54) METHODS AND SYSTEMS FOR CHARGING ELECTROCHEMICAL CELLS

(75) Inventor: Rachid Yazami, Los Angeles, CA (US)

(73) Assignees: CALIFORNIA INSTITUTE OF TECHNOLOGY, Pasadena, CA (US); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 756 days.

(21) Appl. No.: 13/215,506

(22) Filed: Aug. 23, 2011

(65) Prior Publication Data

US 2012/0043929 A1 Feb. 23, 2012

Related U.S. Application Data

(60) Provisional application No. 61/376,208, filed on Aug. 23, 2010.

(51) Int. Cl.
*H01M 10/44* (2006.01)
*H01M 10/46* (2006.01)
*H02J 7/00* (2006.01)

(52) U.S. Cl.
CPC ....... *H02J 7/0081* (2013.01); *H02J 2007/0098* (2013.01)

(58) Field of Classification Search
CPC ..... H02J 7/0042; H02J 7/0045; H02J 7/0078; H02J 7/0081
USPC ......... 320/107, 132, 133, 152, 155, 156, 157, 320/159, 162
See application file for complete search history.

(56) References Cited

U.S. PATENT DOCUMENTS 3,919,618 A  11/1975  Coleman et al.
4,052,539 A  10/1977  Newman et al.
(Continued)

FOREIGN PATENT DOCUMENTS

CN  1525592  9/2004
CN  1604373  4/2005
(Continued)

OTHER PUBLICATIONS

Al Hallaj et al. (2000) "Characterization of Commercial Li-ion Batteries Using Electrochemical-calorimetric Measurements" *J. Power Sources* 87(1-2):186-194.
(Continued)

*Primary Examiner* — Edward Tso
(74) *Attorney, Agent, or Firm* — Lathrop & Gage LLP

(57) ABSTRACT

The invention provides systems and methods for charging an electrochemical device, such as a secondary electrochemical cell. Charging systems and methods of some embodiments provide charging parameters, such as charging voltage and charging current, that vary in a preselected manner as a function of time so as to enhance the overall device performance (e.g., specific capacity, discharge rate, etc.) cycling properties and useful lifetime of a secondary electrochemical cell. Charging systems and methods of some embodiments provide charging parameters, such as time varying charging voltages and charging currents, that take into consideration important electrochemical cell properties that impact device performance, cycling and lifetime, such as the state of health of an electrochemical cell, and/or the health and/or composition of specific system components such as anode, cathode, and electrolyte and/or the cycle history of the electrochemical cell (e.g., cycle number, etc.).

31 Claims, 2 Drawing Sheets

(56) References Cited

U.S. PATENT DOCUMENTS

| | | | |
|---|---|---|---|
| 4,295,097 A | 10/1981 | Thompson et al. | |
| 4,438,086 A | 3/1984 | Aramaki et al. | |
| 4,725,784 A | 2/1988 | Peled et al. | |
| 5,339,018 A | 8/1994 | Brokaw | |
| 5,459,671 A | 10/1995 | Duley | |
| 5,600,226 A | 2/1997 | Falcon | |
| 5,642,031 A | 6/1997 | Brotto | |
| 5,670,862 A | 9/1997 | Lewyn | |
| 5,998,968 A | 12/1999 | Pittman et al. | |
| 6,016,047 A | 1/2000 | Notten et al. | |
| 6,068,921 A | 5/2000 | Yamana et al. | |
| 6,175,215 B1 | 1/2001 | Fitzgerald et al. | |
| 6,306,540 B1 | 10/2001 | Hiroi et al. | |
| 6,392,385 B1 | 5/2002 | Barker et al. | |
| 6,489,055 B1 | 12/2002 | Ichihashi et al. | |
| 6,496,536 B2 * | 12/2002 | Mollenkopf | 375/227 |
| 6,667,131 B1 | 12/2003 | Vitins et al. | |
| 6,852,446 B2 | 2/2005 | Barbarich | |
| 7,109,685 B2 | 9/2006 | Tate, Jr. et al. | |
| 7,132,832 B2 | 11/2006 | Vaullancourt et al. | |
| 7,227,336 B1 | 6/2007 | van Schalkwijk et al. | |
| 7,541,775 B2 | 6/2009 | Lee | |
| 7,563,542 B2 | 7/2009 | Yazami et al. | |
| 7,595,611 B2 | 9/2009 | Reynier et al. | |
| 7,960,946 B2 | 6/2011 | Ozawa et al. | |
| 8,008,891 B2 | 8/2011 | Yun et al. | |
| 8,446,127 B2 | 5/2013 | Yazami et al. | |
| 8,901,892 B2 | 12/2014 | Yazami et al. | |
| 2001/0001533 A1 | 5/2001 | Stuck Andersen et al. | |
| 2003/0102845 A1 * | 6/2003 | Aker et al. | 320/139 |
| 2003/0206021 A1 | 11/2003 | Laletin et al. | |
| 2004/0046564 A1 | 3/2004 | Klang et al. | |
| 2004/0128089 A1 | 7/2004 | Barsoukov et al. | |
| 2004/0220758 A1 | 11/2004 | Barsoukov et al. | |
| 2005/0073315 A1 | 4/2005 | Murakami et al. | |
| 2006/0100833 A1 | 5/2006 | Plett | |
| 2006/0208704 A1 | 9/2006 | Iwane et al. | |
| 2007/0182418 A1 | 8/2007 | Reynier et al. | |
| 2007/0299620 A1 | 12/2007 | Yun et al. | |
| 2009/0024339 A1 | 1/2009 | Shoji | |
| 2009/0132186 A1 | 5/2009 | Esnard et al. | |
| 2010/0090650 A1 | 4/2010 | Yazami et al. | |
| 2010/0201322 A1 * | 8/2010 | Stanley | 320/134 |
| 2011/0121786 A1 | 5/2011 | Tsuruta et al. | |
| 2011/0169459 A1 | 7/2011 | Chen et al. | |
| 2013/0271089 A1 | 10/2013 | Yazami et al. | |
| 2013/0322488 A1 | 12/2013 | Yazami et al. | |

FOREIGN PATENT DOCUMENTS

| | | |
|---|---|---|
| CN | 1604383 | 6/2005 |
| EP | 0 867 958 | 9/1998 |
| EP | 0 898 321 | 2/1999 |
| EP | 1 460 441 | 9/2004 |
| EP | 1 524 712 | 4/2005 |
| EP | 1 643 260 | 4/2006 |
| EP | 1 873 542 | 1/2008 |
| GB | 1470376 | 4/1977 |
| GB | 1488366 | 10/1977 |
| JP | H07-065833 | 3/1995 |
| JP | H09-113589 | 5/1997 |
| JP | H10-275617 | 10/1998 |
| JP | H10-302765 | 11/1998 |
| JP | H11-040189 | 2/1999 |
| JP | 2002-521792 | 7/2002 |
| JP | 2003-502792 | 1/2003 |
| JP | 2003-523049 | 7/2003 |
| JP | 2005-043339 | 2/2005 |
| KR | 10-2008-0000160 | 1/2008 |
| WO | WO 97/49158 | 12/1997 |
| WO | WO 99/56121 | 11/1999 |
| WO | WO 00/05596 | 2/2000 |
| WO | WO 01/59443 | 8/2001 |
| WO | WO 2007/117263 | 10/2007 |
| WO | WO 2010/105062 | 9/2010 |
| WO | WO 2014/021957 | 2/2014 |

OTHER PUBLICATIONS

Al Hallaj et al. (2000) "Entropy Changes Due to Structural Transformation in the Graphite Anode and Phase Change of the LiCoO2 Cathode," *J. Electrochem Soc*.147:2432-2436.

Amatucci et al. (1999) "The Elevated Temperature Performance of the LiMn2)4/C System: Failure and Solutions," *Electrochimica Acta* 45(1-2):255-271.

Amatucci et al. (Dec. 1997) "Surface Treatments of Li1+xMn2−xO4 Spinels for Improved Elevated Temperature Performance," *Solid State Ionics* 104(1-2):13-25.

Amatucci et al. (Mar. 1996) "CoO2, the End Member of the LixCoO2 Solid Solution," *J. Electrochem. Soc.* 143(3):1114-1123.

Attidekou et al. (Web Release Jan. 18, 2007) "Thermodynamic Aspects of the Reaction of Lithium with SnP2O7 Based Positive Electrodes," *J. Electrochem. Soc.* 154(3):A217-A220.

Aurbach et al. (1999) "Capacity Fading of LixMn2O4 Spinel Electrodes Studied by XRD and Electroanalytical Techniques," *J. Power Sources* 81:472-479.

Aydinol et al. (Jul. 15, 1997) "Ab initio Study of Lithium Intercalation in Metal Oxides and Metal Dichalcogenides," *Phys. Rev. B.* 56(3):1354-1365.

Baddour et al. (1991) "A Thermodynamic, Structural and Kinetic-Study of the Electrochemical Lithium Intercalation into the Xerogel V2O5.1.6 H2O in a Propylene Carbonate Solution," *J. Electroanal. Chem.* 314(1-2):81-101.

Barbato et al. (2002) "Hollandite Cathodes for Lithium Ion Batteries. 2. Thermodynamic and Kinetics Studies of Lithium Insertion into BaMmn7O16 (M=Mg, Mn, Fe, Ni)," *Electrochim. Acta* 46(18):2767-2776.

Barker et al. (1995) "Kinetics and Thermodynamics of the Lithium Insertion Reaction in Spinel Phase LixMn2O4," *J. Power Sources* 54(2):475-478.

Benco et al. (1999) "First Principles Calculation of Electrode Material for Lithium Intercalation Batteries: TiS2 and LiTi2S4 Cubic Spinel Structures," *J. Solid State Chem.* 145(2):503-510.

Bhatia et al. (1997) "Effect of Sintering Temperature on the Characteristics of Carbons Based on Mesocarbon Microbeads," *J. Mater. Sci.* 32(1):135-139.

Billaud et al. (1996) "Revisited Structures of Dense and Dilute Stage II Lithium-Graphite Intercalation Compounds," *J. Phys. Chem. Solids* 57(6-8):775-781.

Botte et al. (2000) "Mathematical Modeling of Secondary Lithium Batteries," *Electrochimica Acta* 45(15-16):2595-2609.

Carlier et al. (2003) "First-Principles Investigation of Phase Stability in the O2—LiCoO2 System," *Chem. Mater.* 15(13):2651-2660.

Ceder et al. (1998) "Thermodynamics of Oxides with Substitutional Disorder: A Microscopic Model and Evaluation of Important Energy Contributions," *J. Am. Ceramic Soc.* 81(3):517-525.

Ceder et al. (1999) "Phase Diagrams of Lithium Transition Metal Oxides: Investigations from First Principles," *Electrochimica Acta* 45(1-2):131-150.

Chen et al.(2002) "Staging Phase Transitions in LixCoO2," *J. Electrochem Soc.* 149(12):A1604-A1609.

Chen Zhiwu et al. (2003) "First Principle Investigation of Positive Electrode Material for Lithium Ion Batteries," *Rare Metal Mater. Eng.* 32(9):693-698.—English Abstract Only.

Conway et al. (Web Release Jul. 22, 2003) "Double-Layer and Pseudocapacitance Types of Electrochemical Capacitors and Their Applications to the Development of Hybrid Devices," *J. Solid State Electrochem.* 7:637-644.

Dahn et al. (1983) "Entropy Measurements on LixTiS2," *Can J. Phys.* 61:1093-1098.

Deiss et al. (Nov. 1997) "Average Voltage, Energy Density, and Specific Energy of Lithium-Ion Batteries—Calculation Based on First Principles," *J. Electrochem. Soc.* 144(11):3877-3881.

Doi et al. (Web Release Jun. 27, 2007) "Computer Simulation of a Porous Positive Electrode for Lithium Batteries," *J. Power Sources* 174(2):779-783.

(56) References Cited

OTHER PUBLICATIONS

Filhol et al. (Web Release Feb. 15, 2008) "Phase Diagrams for Systems with Low Free Energy Variation: A Coupled Theory/Experiments Method Applied to Li-Graphite," *J. Phys. Chem. C.* 112(10):3982-3988.

Fujiwara et al. (Web Release Jun. 11, 2003) "Determination of Standard Free Energy of Formation for Niobium Silicides by EMF Measurements," *J. Electrochem. Soc.* 150(8):J43-J48.

Funahashi et. al. (2002) "Thermal Simulation of Large-Scale lithium Secondary Batteries Using a Graphite-Coke Hybrid Carbon Negative Electrode and LiNi0.7Co0.3O2 Positive Electrode" *J. Power Sources* 104(2):248-252.

Gabrisch et al. (Web Release May 15, 2008) "Transmission Electron Microscope Studies of LiNi1/3Mn1/3Co1/3O2 before and after Long-Term Aging at 70 Degrees C, " *Electrochem. Solid-State Lett* 11(7):119-124.

Gabrisch et al. (Web Release May 4, 2004) "Hexagonal to Cubic Spinel Transformation in Lithiated Cobalt Oxide—TEM Investigation," *J. Electrochem. Soc.* 151(6):A891-A897.

Garcia-Belmonte et al. (2006) "Correlation Between Volume Change and Cell Voltage Variation with Composition for Lithium Intercalated Amorphous Films," *J. Phys. Chem. B.* 110(10):4514-4518.

Gautier et al. (1997) "Effect of the ZnNiyMn2—yO4 (0±y±1 ) Spinel Composition on Electrochemical Lithium Insertion," *J. Solid Stat Electrochem.* 1(2):126-133.

Gong et al. (2000) "Electrochemical Intercalation of Lithium and Lithium Species into Disordered Carbon Prepared by the Heat-Treatment of Poly (p-Phenylene) at 650 Degrees C for Anode in Lithium-Ion Battery," *Electrochimica Acta* 45(11):1753-1762.

Graetz et al. (Web Release Jan. 12, 2002) "Electronic Structure of Chemically Delithiated LiCoO2 Studied by Electron Energy-Loss Spectrometry," *J. Phys. Chem. B* 106(6):1286-1289.

Gupta et al. (1972) "Thermodynamic and Physical Properties of Molten Sodium Polysulfides from Open-Circuit Voltage Measurements," *J. Electrochem. Soc.* 119(8):1033-1037.

Guzman et al. (1996) "Lithium Intercalation Studies in Hydrated Molbdenum Oxides," *Solid State Ionics* 86-8:407-413 part 1.

Hallstedt et al. (2007) "Thermodynamic Assessment of the Al-Li System," *Int. J. Mater. Res.* 98(10):961-969.

Hill et al. (1992) "Microcalorimetic Studies on Lithium Thionyl Chloride Cells—Temperature Effects Between 25-Degrees-C and -40-Degrees-C," *J. Power Sources* 39(1):83-94.

Hong et al. (2000) "Relationship Between Calorimetric and Structural Characteristics of Lithium-Ion Cells—I. Thermal Analysis and Phase Diagram," *J. Electrochem. Soc.* 147(9):3183-3189.

Hong et al. (May 1998) "Electrochemical-Calorimetric Studies of Lithium-Ion Cells," *J. Electrochem Soc.* 145(5):1489-1501.

Hu et al. (Aug. 5, 2010) "Effects of the LiFePO4 Content and the Preparation Method on the Properties of (LiFePO4+AC)/Li4Ti5O12 Hybrid Battery-Capacitors," *J. Serb. Chem. Soc.* 75(9):1259-1269.

Huang et al. (1999) "Correlating Capacity Loss of Stoichiometric and Nonstoichiometric Lithium Manganese Oxide Spinel Electrodes with Their Structural Integrity," *J. Electrochem Soc.* 146(10):3649-3654.

Huang et. al. (Web Release Aug. 1, 2005) "Thermal Study on Single Electrodes in Lithium Ion Battery" *J. Power Sources* 156(2):541-546.

Huggins, R.A. (1999) "Lithium Alloy Negative Electrodes," *J. Power Sources* 82:13-19.

Idemoto et al. (2000) "Thermodynamic Stability and Cathode performance of Limn2-xmgxo4 as Cathode Active Material for the Lithium Secondary Battery," *Electrochemistry* 68(6):469-473.

Idemoto et al. (2003) "Crystal Structure and Cathode Performance Dependence on Oxygen Content of LiMn1.5Ni0.5O4 as a Cathode Material for Secondary Lithium Batteries," *J. Power Sources* 119-121:125-129.

Idemoto et al. (2006) "Dependence of Properties, Crystal Structure and Electrode Characteristics on Li Content for Lix(Ni,Co)O2 as a Cathode Active Material for Li Secondary Batteries," 210th Meeting of the Electrochemical Society, Oct. 29-Nov. 3, 2006, Moon Palace Resort Hotel, Cancun Mexico, Abstract # 13.

Idemoto et al. (2006) "Dependence of Properties, Crystal Structure and Electrode Characteristics on Li Content for LixCo1/3Ni1/3Mn1/3O2δ as a Cathode Active Material for Li Secondary Battery," *Electrochemistry* 74(9):752-757—English Abstract Only.

Idemoto et al. (Mar. 9, 2000) "Thermodynamic Stability and Cathode Performance of Li1+xMn2-xO4 as a Cathode Active Material for Lithium Secondary Battery," *J. Ceram. Soc. Jpn.* 108(9):848-853—English Abstract Only.

International Search Report and Written Opinion corresponding to International Application No. PCT/US2013/038407, mailed Feb. 16, 2014.

International Search Report and Written Opinion corresponding to International Application No. PCT/US2010/026991, Mailed May 12, 2010.

International Search Report and Written Opinion corresponding to International Application No. PCT/US2006/030137, Mailed Jun. 10, 2008.

Joo et al. (Web Release Aug. 17, 2006) "Molecular Thermodynamics Approach for Phase Behaviors of Solid Polymer Electrolytes/Salt System in Lithium Secondary Battery on the Nonrandom Mixing Effect: Applicability of the Group-Contribution Method," *Polymer* 47(20):7153-7159.

Joo et al. (Web Release Nov. 23, 2005) "Phase Behaviors on Solid Polymer Electrolytes/Salt System in Lithium Secondary Battery by Group-Contribution Method: The Pressure Effect," *Polymer* 47(1):211-217.

Kalikmanov et al. (Feb. 15, 2002) "Role of Elasticity Forcesin Thermodynamics of Intercalation Compounds: Self-Consistent Mean-Field Theory and Monte Carlo Simulations," *J. Chem. Phys.* 116(7):3083-3089.

Kataoka et al. (2002) "Lithium Storage Mechanism of Disordered Mesophase Carbon Fibers Studies by 7Li-Nuclear Magnetic Resonance," *Electrochem. Solid-State Lett.* 5(1):A10-A13.

Kim et al. (2001) "Thermodynamic and Kinetic Approached to Lithium Intercalation into a Li1-Delta Mn2O4 Electrode Using Monte Carlo Simulation," *Electrochimica Acta* 46(7):987-997.

Kobayashi et al. (Web Release Dec. 1, 2003) "Structure Determination of Li1—yNi0.5Mn0.5O2 (y=0.5) Using a Combination of Rietveld Analysis and the Maximum Entropy Method," *J. Mater. Chem.* 14(1):40-42.

Korovin, N.V. (1998) "Electrochemical Intercalation into Cathodic Materials: Electrode Potentials," *Russian J. Electrochem.* 34(7):669-675.

Koudriachova et al. (2004) "First Principles Predictions for Intercalation Behavior," *Solid State Ionics* 175(1-4):829-834.

Kudo et al. (1998) "Theoretical Dependence of the Free Energy and Chemical Potential Upon Composition in Intercalation Systems with Repulsive Interaction Between Guest Ions," *Electrochim acta* 43(7):781-789.

Kuhn et al. (2001) "On the Synthesis of Ramsdellite LiTiMO4 (M=Ti, V, Cr, Mn, Fe): An Experimental and Computational Study of the Spinel-Ramsdellite Transformation," *Eur. J. Inorg. Chem.* (21):3375-3384.

Kumagai et al. (1997) "Electrochemical Intercalation of Lithium into Hexagonal Tungsten Trioxide," *Thermochimica Acta* 299(1-2):19-25.

Kumagai et al. (1997) "Thermodynamics and Kinetics of Electrochemical Intercalation of Lithium into Li0.50WO3.25 with a Hexagonal Tungsten Bronze Structure," *Solid State Ionics* 98(3-4):159-166.

Kumagai et al. (1999) "Thermodynamics and Kinetics of Lithium Intercalation into Mb2O5 Electrodes for a 2V Rechargeable Lithium Battery," *J. Electrochem. Soc.* 146(9):3203-3210.

Kumagai et al. (Nov. 1993) "Thermodynamic and Kinetic-Studies of Electrochemical Lithium Insertion Into Quaternary Li—Mn—V—O Spinel as Positive Materials for Rechargeable Lithium Batteries," *J. Electrochem. Soc.* 140(11):3194-3199.

Kumaresan et al. (Web Release Dec. 18, 2007) "Thermal Model for a Li-Ion Cell" *J. Electrochem. Soc.* 155:A164-A171.

Lee et al. (2003) "Identity and Thermodynamics of Lithium Intercalated in Graphite," *J. Power Sources* 114(2):285-291.

(56) References Cited

OTHER PUBLICATIONS

Letellier et al. (2004) "The First situ 7Li NMR Study of the Reversible Lithium Insertion Mechanism in Disorganized Carbons," *J. Phys. Chem. Solids* 65:245-251.
Limthongkul et al. (2003) "Electrochemically-Driven Solid-State Amorphization in Lithium-Metal Anodes," *J. Power Sources* 119:604-609.
Lu et al (Web Release Sep. 15, 2006) "In Situ Thermal Study of Li1+x[Ni3Co1/3Mn1/3]1−xO2 Using Isothermal Micro-calorimetric Techniques" *J. Electrochem. Soc.* 153(11):A2147-A2151.
Lu et al. (Web Release Aug. 8, 2005) "Determination of the Reversible and Irreversible Heats of LiNi0.8Co0.2O2mesocarbon Microbead Li-Ion Cell Reactions Using Isothermal Microcalorimetery," *Electrochim. Acta* 51(7):1322-1329.
Lu et al. (Web Release Mar. 7, 2007) "Isothermal Calorimetry Investigation of Li1+xMn2−yAlzO4 Spinel" *Electrochim. Acta* 52(19):5837-5842.
Lu et. al (Web Release Jun. 30, 2007) "Thermal Properties of Li4/3Ti5/3O4/LiMn2O4 Cell" *J. Power Sources* 174:673-677.
Mabuchi et al. (Apr. 1995) "Charge-Discharge Characteristics of the Mesocarbon Microbeads Heat-Treated at Different Temperatures," *J. Electrochem. Soc.* 142(4):1041-1046.
Maier, J. (Dec. 6, 2007) "Size Effects on Mass Transport and Storage in Lithium Batteries," *J. Power Sources* 174(2):569-574.
Martinez et al. (Jun. 15-19, 2008) "Describing Function Analysis of the Electric Nonlinear Model of a SRM Autonomous AC Generator," in; *IEEE, Power Electronics Specialists Conference*, 2008. Rhodes, Greece. pp. 4051-4055.
Masoum et al. (2004) "Micrprocessor-Controlled New Class of Optimal Battery Chargers for Photovoltaic Applications," *IEEE Transactions on Energy Conversion.* 19(3):599-606.
McMenamin et al. (Dec. 8, 2008) "Using Electrochemical Thermodynamic Measurements to Detect Effects of Battery Aging," Lithium Mobile Power 2008, Las Vegas; Power Point Presentation.
Mering et al. (1960) "Le Processus de la Graphitation," *J. Chim. Phys. Fr.* 57:803-814.
Mori et al. (Aug. 1995) "Lithium Doping/Undoping in Disordered Coke Carbons," *J. Power Sources* 56:205-208.
Nikiel, L.W. (1993) "Raman-Spectroscopic Characterization of Graphites—A Reevaluation of Spectra/Structure Correlation," *Carbon* 31(8):1313-1317.
Oberlin et al. (1975) "Graphitization Studies of Anthracites by High Resolution Electron Microscopy," Carbon 13(5):367-376.
Oberlin, A. (1984) "Carbonization and Graphitization," Carbon 22(6):521-541.
Ohshima et al. (2006) "Thermal Behavior of Small Lithium-ion Secondary Battery During Rapid Charge and Discharge Cycles" Electrical Engineering in Japan 157(3): 17-25.
Ohzuku et al. (Nov. 1994) "A Solid-State Redox Reactions of LiCoO2 (R(3)over-bar-m) for 4 Volt Secondary Lithium Cells," J. Electrochemical Soc. 141(11):2972-2977.
Okamoto et al. (2007) "Analysis of Heat Generation of Lithium Ion Rechargeable Batteries Used in Implantable Battery Systems for Driving Undulation Pump Ventricular Assist Device" Artificial Organs 31(7):538-541.
Ol'shanskaya et al. (2002) "Thermodynamics of Lithium Intercalates in Carbonized Fabric," Russian J. Appl. Chem. 75(5):740-744.
Paddon et al. (2007) "Kinetics and Thermodynamics of the Li/Li+ Couple in Tetrahydrofuran at Low Temperatures (195-295K)," J. Phys. Org. Chem. 20(9):677-684.
Papanek et al. (1996) "Lithium Insertion in Disordered Carbon-Hydrogen Alloys: Intercalation vs. Covalent Binding," Chem. Mater. 8(7):1519-1526.
Papanek et al. (2001) "Neutron Scattering Studies of Disordered Carbon Anode Materials," J. Phys. Condens. Matter 13:8287-8301.
Quintin et al. (Web Release Jun. 27, 2006) "Study of Lithium Insertion-Deinsertion Mechanism in Nanocrystalline Gamma-Fe2O3 Electrodes by Means of Electrochemical Impedance Spectroscopy," Electrochimica Acta 51(28):6426-6434.

Rao et al. (1997) "Heat-Generation Rate and General Energy Balance for Insertion Battery Systems," J. Electrochem. Soc.144(8):2697-2704.
Reynier et al. (2003) "The entropy and enthalpy of lithium intercalation into graphite," J. Power Sources 119-121:850-855.
Reynier et al. (2004) "Entropy of Li intercalation in LixCoO2," Physical Review B 70, 174304.
Reynier et al. (2004) "Thermodynamics of Lithium Intercalation into Graphites and Disordered Carbons," J. Electrochem. Soc. 151(3):A422-A426.
Reynier et al. (2007) "Evolution of lithiation thermodynamics with the graphitization of carbons," J. Power Sources 165:552-558.
Rosalind E.F. (Oct. 23, 1951) "Crystallite Growth in Graphitizing and Non-Graphitizing Carbons," Proc. Royal Soc. London. A. Math. Phys. Sci. 209(1097):196-218.
Sainz et al. (Apr. 13-15, 2011) "Experimental Measurements About Harmonic Current Mitigation of Electric Vehicle Battery Chargers," in; The International Conference on Renewable Energies and Power Quality, Las Palmas de Gran Canaria, Spain.
Saito et al. (1997) "Thermal Studies of a Lithium-ion Battery" J. Power Sources 68(2):451-454.
Sandhu et al. (1999) "Thermodynamic Equations for a Model Lithium-ion Cell" Electrochimica Acta 45(6):969-976.
Schoonman, J. (2003) "Nanoionics," Solid State Ionics 157(1-4):319-326.
Seel and Dahn J. (2000), "Electrochemical Intercalation of PF6 into Graphite," Journal of Electrochemical Society, 147(3) 892-898.
Selman et. al. (2001) "Cooperative Research on Safety Fundamentals of Lithium Batteries" J. Power Sources 97(8):726-732.
Shi et al. (2003) "First-Principles Studies of Cation-Doped Spine LiMn2O4 for Lithium Ion Batteries," Phys. Rev. B 67(11):115130.
Shi et al. (Jul 10, 2007) "Effect of Mg-Doping on the Structural and Electronic Properties of LiCoO2: A First-Principles Investigation," J. Power Sources 171(2):908-912.
Shin et al. (Web Release Jan. 8, 2004) "Factors Influencing the Capacity Fade of Spinel Lithium Manganese Oxides," J. Electrochem. Soc. 151(2):A204-A208.
Shiraishi et al. (2001) "EELS Analysis of Electrochemically Deintercalated Li1—xMn2O4 and Substitutes Spinets LiMn1.6M0.4O4 (M=Co, Cr, Ni)," J. Power Sources 97(8):461-464.
Stevens et al. (Aug. 2001) "The Mechanisms of Lithium and Sodium Insertion in Carbon Materials," J. Electrochem. Soc. 148(8):A803-A811.
Takahashi et al. (Web Release Oct. 29, 2006) "Structure and Electron Density Analysis of Electrochemically and Chemically Delithiated LiCoO2 Single Crystals," J. Solid State Chem. 180(1):313-321.
Takano et. al. (2002) "Entropy Change in Lithium Ion Cells on Charge and Discharge" J. App. Electochem. 32(3):251-258.
Tarascon et al. (Oct. 1991) "Li Metal-Free Rechargeable Batteries Based on Li1+xMn2O4 Cathodes (0 less-than-or-equal-to x less-than-or-equal-to 1) and Carbon Anodes," J. Electrochem. Soc. 138(10):2864-2868.
Thomas et al. (2001) "Measurement of the Entropy of Reactions as a Function of State of Charge in Doped and Undoped Lithium Manganase Exide," J. Electrochem. Soc. 148(6):A570-A575.
Thomas et al. (2003) "Heats of Mixing and of Entropy in Porous Insertion Electrodes," J. Power Sources 119:844-849.
Thomas et al. (2003) "Thermal Modeling of Porous Insertion Electrodes," J. Electrochem. Soc. 150(2):A176-A192.
Tuinstra et al. (Aug. 1, 1970) "Raman Spectrum of Graphite," J. Chem. Phys. 53(3):1126-1130.
Van der Ven et al. (1998) "First-Principles Evidence for Stage Ordering in LixCoO2," J. Electrochem. Soc. 145(6):2149-2155.
Vicente et al. (2004) "Understanding the Voltage Profile of Li Insertion into LiNi0.5—yFeMn1.5O4 in Li Cells," Electrochim. Acta 49(12):1963-1967.
Vitins et al. (1997) "Lithium Intercalation into Layered LiMnO2," J. Electrochem. Soc. 144(8):2587-2592.
Wada et al. (1980) "'Diamond-Like' 3-fold Coordinated Amorphous Carbon," J. Non-Cryst. Solids 35:543-548.
Wagemaker et al. (Web Release Jun. 20, 2005) "Thermodynamics of Spinel LixTiO2 from First Principles," Chem. Phys. 317(2-3)130-136.

(56) References Cited

OTHER PUBLICATIONS

Wakihara, M. (2005) "Lithium Manganese Oxides with Spinel Structure and Their Cathode Properties for Lithium Ion Battery," Electrochemistry 73(5):328-335.

Wang et al. (2004) "Enthalpy of Formation of LiNiO2, LiCoO2 and their Solid Solutions LiNi1—xCox02," Solid State Ionics 166(1-2):167-173.

Wang et al. (2005) "LiMO2 (M=Mn, Fe, and Co): Energetics, Polymorphism and Phase Transformation," J. Solid State Chem. 178(4):1230-1240.

Wang et al. (2007) "A First-Principles Approach to Studying the Thermal Stability of Oxide Cathode Materials," Chem. Mater. 19(3):543-552.

Whitacre et al. (2007) "Enhanced Low-Temperature Performance of Li—CFx Batteries," Electrochem. Solid-State Lett. 10(7):A166-A170.

Xu et al. (Mar. 1, 2003) "Nanocrystalline Ferric Oxide Cathode for Rechargeable Lithium Batteries," Electrochem. Solid Stet Lett. 6(9):A190-A193.

Yamaki et al. (2000) "Potential and Thermodynamics of Graphite Anodes in Li-Ion Cells," J. Electrochem. Soc. 147(2):460-465.

Yamaki et al. (2001) "Thermodynamics and Phase Separation of Lithium Intercalation Materials Used in Lithium Ion Cells," Electrochemistry 69(9):664-669—English Abstract Only.

Yamaki et al. (2001) "Voltage Prediction from Coulomb Potential Created by Atoms of Spinel LiMn2O4 Cathode Active Material for Li Ion Cells," J. Power Sources 97-8:349-353.

Yazami et al. (2006) "Thermodynamics and crystal structure anomalies in lithium-intercalated graphite," J. Power Sources 153:312-318.

Yazami et al. (Web Release Apr. 30, 2007) "Fluorinated Carbon Nanofibres for High Energy and High Power Densities Primary Lithium Batteries," Electrochem. Commun. 9:1850-1855.

Yazami, R. (Dec. 2009) "Thermodynamics of Electrode Materials for Lithium-Ion Batteries," in; Kazunori Ozawa Ed., Lithium Ion Rechargeable Batteries: Materials, Technology, and New Applications, Wiley-VCH Verlag GmbH and Co. Ch. 5, pp. 67-101.

Zhou et al. (2006) "Configurational Electronic Entropy and the Phase Diagram of Mixed-Valance Oxides: The Case of Lixfwpo4," Phys. Rev. Lett. 97:155704.

\* cited by examiner

METHODS AND SYSTEMS FOR CHARGING ELECTROCHEMICAL CELLS

CROSS-REFERENCE TO RELATED APPLICATIONS

This application claims the benefit of U.S. Provisional Patent Application 61/376,208 filed Aug. 23, 2010, which is hereby incorporated by reference in its entirety.

STATEMENT REGARDING FEDERALLY SPONSORED RESEARCH OR DEVELOPMENT

Not applicable.

BACKGROUND OF INVENTION

Since their invention over 200 years ago, electrical batteries have become a global multibillion-dollar industry that demonstrates continued growth. Over the last few decades, revolutionary advances have been made in electrochemical storage and conversion devices expanding the capabilities of these systems in a variety of fields including portable electronic devices, transportation, air and space craft technologies, renewable energy technologies, and biomedical devices. Current state of the art electrochemical storage and conversion devices have designs and performance attributes that are specifically engineered to provide compatibility with a diverse range of application requirements and operating environments. For example, advanced electrochemical storage systems have been developed spanning the range from high energy density batteries exhibiting very low self-discharge rates and high discharge reliability for implanted medical devices to inexpensive, light weight rechargeable batteries providing long runtimes for a wide range of portable electronic devices, to high capacity batteries for military and aerospace applications capable of providing extremely high discharge rates over short time periods.

With the expansion and proliferation of personal electronic devices, electric automobiles, and other battery-powered technologies, development of lighter, more efficient, and more powerful battery technologies has been identified as essential for the continued development of these technologies. For example, continued development in the fields of electric vehicles and aerospace engineering has also created a need for mechanically robust, high reliability, high energy density and high power density batteries capable of good device performance in a useful range of operating environments. Furthermore, the demand for miniaturization in the field of consumer electronics and instrumentation continues to stimulate research into novel design and material strategies for reducing the sizes, masses and form factors of high performance batteries.

Batteries may be classified into two categories; disposable or 'primary' batteries, and rechargeable or 'secondary' batteries. Generally having higher energy densities than secondary batteries, primary batteries such as alkaline and zinc-carbon batteries are often used in portable electronic devices having low current drain. Secondary batteries such as nickel-cadmium, nickel-zinc, nickel metal hydride, and lithium-ion batteries are used in a wide range of applications such as power tools, medical equipment, personal portable electronic devices, and all-electric plug-in vehicles. Although secondary batteries have a higher initial cost than primary batteries, they may be charged very cheaply and used many times, thus having a lower total cost of use. Batteries from both categories consist of a positive electrode (cathode during discharge), a negative electrode (anode during discharge) and an electrolyte. The electrolyte contains ionic species that function as charge carriers for the oxidation and reduction processes occurring at the electrodes. During charge and discharge, electrodes exchange ions with electrolyte and electrons with an external circuit (a load or a charger).

Many recent advances in electrochemical storage and conversion technology are directly attributable to discovery and integration of new materials for battery components. Lithium battery technology, for example, continues to rapidly develop, at least in part, due to the discovery of novel electrode and electrolyte materials for these systems. Development of intercalation host materials for negative electrodes has led to the discovery and commercial implementation of lithium ion based secondary batteries exhibiting high capacity, good stability and useful cycle life. As a result of these advances, lithium based battery technology is currently widely adopted for use in a range of important applications including primary and secondary electrochemical cells for portable electronic systems.

The element lithium has a unique combination of properties that make it attractive for use in an electrochemical cell. First, it is the lightest metal in the periodic table having an atomic mass of 6.94 AMU. Second, lithium has a very low electrochemical oxidation/reduction potential, i.e., −3.045 V vs. NHE (normal hydrogen reference electrode). This unique combination of properties enables lithium based electrochemical cells to have very high specific capacities. Advances in materials strategies and electrochemical cell designs for lithium battery technology have realized electrochemical cells capable of providing useful device performance including: (i) high cell voltages (e.g. up to about 3.8 V), (ii) substantially constant (e.g., flat) discharge profiles, (iii) long shelf-life (e.g., up to 10 years), and (iv) compatibility with a range of operating temperatures (e.g., −20 to 60 degrees Celsius). As a result of these beneficial characteristics, primary lithium batteries are widely used as power sources in a range of portable electronic devices and in other important device applications including, electronics, information technology, communication, biomedical engineering, sensing, military, and lighting.

State of the art lithium ion secondary batteries provide excellent charge-discharge characteristics, and thus, have been widely adopted as power sources in portable electronic devices, such as cellular telephones and portable computers. U.S. Pat. Nos. 6,852,446, 6,306,540, 6,489,055, and "Lithium Batteries Science and Technology" edited by Gholam-Abbas Nazri and Gianfranceo Pistoia, Kluer Academic Publishers, 2004, are directed to lithium and lithium ion battery systems which are hereby incorporated by reference in their entireties.

Charging a secondary battery typically involves passing direct current (d.c.) electricity through the battery in a manner to reverse the discharge process. During charging, electrochemical oxidation of the active material occurs at the positive electrode, while electrochemical reduction takes place at the negative electrode. The charging conditions (e.g., charging voltage, charging current, temperature, overvoltage, etc.) play a significant role in establishing and maintaining the useful lifetime of a battery system. In addition, if current continues to be provided after completion of recharging, the battery may be provided in an overcharge state, which can result in degradation of battery components, for example, via decomposition of electrolyte.

Lithium ion batteries, for example, are commonly charged using the constant-current, constant voltage (CCCV) method. In the CCCV method, the current is held constant typically until the battery voltage reaches a pre-defined value, for example, the voltage in which gassing is likely to begin. At this point, the voltage is held constant while the current is allowed to decline exponentially. In some charging systems, a top-off charge also is provided periodically for certain recharge cycles. In addition to controlling applied constant current and final voltage, charging systems for lithium ion batteries typically monitor and control some battery safety parameters such as temperature and overcharge currents and voltages. In addition, some chargers for these batteries also take into account the battery cycle life to adjust the CCCV conditions. Occasionally, linear voltammetry (LV) is used in systems and methods to charge batteries, such as lithium ion batteries, wherein a charging voltage is applied that varies linearly with time over a minimum and maximum voltage range.

Many state of the art CCCV and LV procedures and systems for charging lithium ion batteries, however, fail to take into account certain system parameters that can significantly impact cycling performance and battery lifetime. These parameters include, for example, the battery 'state of health' (SOH), and/or the health and/or composition of specific system components such as the anode, cathode, and electrolyte (See, e.g., US 2010/0090650). The SOH varies with the system 'history', such as for the most common charge/discharge cycles, overcharge and over-discharge, and thermal aging. In some instances, for example, degradation of one of the active components: anode, cathode and electrolyte, affects the cell's SOH. The failure of state of the art charging systems to take into account the SOH, for example, may result in premature battery aging and irreversible losses in stored energy upon cycling.

As will be clear from the foregoing, there exists a need in the art for an improved methods and systems for charging batteries. Specifically, chargers and charging methods are needed that take into account system parameters that can affect cycling performance and battery lifetime, such as the battery's SOH and the health and/or composition of system components.

SUMMARY OF THE INVENTION

The invention provides systems and methods for charging an electrochemical device, such as a secondary electrochemical cell. Charging systems and methods of some embodiments provide charging parameters, such as charging voltage and charging current, that vary in a preselected manner as a function of time so as to enhance the overall device performance (e.g., specific capacity, discharge rate, etc.) cycling properties and useful lifetime of a secondary electrochemical cell. Charging systems and methods of some embodiments provide charging parameters, such as time varying charging voltages and charging currents, that take into consideration important electrochemical cell properties that impact device performance, cycling and lifetime, such as the state of health of an electrochemical cell, state of charge of the electrochemical cell, and/or the health and/or composition of specific system components such as the anode, cathode, and electrolyte and/or the cycle history of the electrochemical cell (e.g., cycle number, etc.).

In an aspect, the invention provides a method of charging an electrochemical cell, the method comprising the steps of: (1) providing the electrochemical cell, for example in a partially or completely discharged state; and (2) providing a time varying charging voltage to the electrochemical cell, thereby generating a charging current resulting in charging of the electrochemical cell; wherein the time varying charging voltage has a non-linear time dependency provided by $V=V_0 \pm k(t)t$ and $V_{min} \leq V \leq V_{max}$; V is the time varying charging voltage, t is time, $V_0$ is an initial voltage, k(t) is a time dependent voltage rate, wherein $V_{min}$ is a minimum voltage provided to the electrochemical cell and $V_{max}$ is a maximum voltage provided to the electrochemical cell. In an embodiment, the invention provides a nonlinear voltammetry method for charging an electrochemical cell.

In an embodiment, k(t) is not a linear function with respect to time, for example, wherein k(t) is a quadratic, polynomial, or exponential function with respect to time or any combination of these. In an embodiment, k(t) is the rate of voltage change in units of V/s. In an embodiment, k(t) defines a charging voltage as a function of time that is different from that provided in a constant-current constant-voltage method. In an embodiment, k(t) defines a charging voltage as a function of time that is different from that provided in a linear voltammetry charging method. As used herein, the expression "time varying" refers to a charging voltage that changes as a function of time over the charging process, for example, changing in a pre-selected manner so as to optimize the overall performance, cycling properties and/or lifetime of the electrochemical cell. In an embodiment, for example, the time varying charging voltage provided to the electrochemical cell reverses the discharge process by providing current to the electrochemical cell, thereby resulting in complete or partial charging of the electrochemical cell. In an embodiment, for example, the time varying charging voltage provided to the electrochemical cell results in electrochemical oxidation at the positive electrode of the electrochemical cell and results in electrochemical reduction at the negative electrode of the electrochemical cell, thereby resulting in complete or partial charging of the electrochemical cell. In an embodiment, for example, the charging voltage is provided to the electrochemical cell over a charging time selected from the range of 1 minute to 100 hours, thereby resulting in complete or partial charging of the electrochemical cell.

In an embodiment, the method of the invention further comprises the step of determining the state of health of the electrochemical cell, state of charge of the electrochemical cell, the composition of the positive electrode of the electrochemical cell, the composition of the negative electrode of the electrochemical cell, the composition of the electrolyte of the electrochemical cell or any combination of these; wherein the non-linear time dependency is derived, at least in part, from the state of health of the electrochemical cell, state of charge of the electrochemical cell, the composition of the positive electrode, the composition of the negative electrode, the composition of the electrolyte or any combination of these. In this aspect of the invention, the dependence of the charge voltage as a function of time is pre-selected based on one or more parameters derived from the electrochemical cell such as the state of health of the electrochemical cell, state of charge of the electrochemical cell, the composition of the positive electrode, the composition of the negative electrode, the composition of the electrolyte or any combination of these. For example, the invention includes methods and systems wherein k(t) is also a function of the electrochemical cell such as the state of health of the electrochemical cell, state of charge of the electrochemical cell, the composition of the positive electrode, the composition of the negative electrode, the composition of the electrolyte or any combination of these.

In an embodiment, the charging voltage has a rate of change that is not constant during at least a portion of the charging process and optionally for the entire duration of the charging process. In an embodiment, for example, the step of providing a charging voltage to the electrochemical cell comprises providing a time varying charging current to the electrochemical cell, for example, a charging current having a non-linear time dependency for at least a portion of, and optionally all of, the charging process. In an embodiment, for example, the charging voltage has a rate of change having an inverse relationship with a rate of change of the charging current over at least a portion of, and optionally all of, the charging process. In an embodiment, for example, a product of the rate of change of the charging voltage and the rate of change of the charging current is constant for at least a portion of, and optionally all of, the charging process. In an embodiment, for example, the charging voltage has a rate of change having an inverse relationship with a rate of change of the charging current raised to an exponential factor for at least a portion of, and optionally all of, the charging process. In an embodiment of this aspect, for example, the method of the invention further comprises a step of selecting the exponential factor for which to determine the charging voltage as a function of time so as to partially or fully charge the electrochemical cell within a selected time, for example, a step of selecting an exponential factor that is greater than zero.

The parameters defining the time varying charging voltage and/or time varying charging current in the methods of the invention may be selected for a given electrochemical device, state of an electrochemical device or application for an electrochemical device. In an embodiment, for example, the time varying charging voltage provided to the electrochemical cell takes into account the state of health of the electrochemical cell. In an embodiment, for example, the time varying charging voltage provided to the electrochemical cell takes into account the heath and/or composition of one or more components of the electrochemical cell, such as the anode, cathode and/or electrolyte. In an embodiment, for example, the time varying charging voltage provided to the electrochemical cell takes into account the cycling history, such as the number of previous charge and discharge cycles. In an embodiment, for example, the time varying charging voltage provided to the electrochemical cell takes into account the discharge and/or charge history, such as the discharge rates or charge rates for previous charge and discharge cycles. In an embodiment, for example, the time varying charging voltage provided to the electrochemical cell results in enhanced device performance, such as increased cycling performance and/or useful lifetime of the electrochemical cell.

In an embodiment, for example, k(t) is selected so as to provide charging voltages as a function of time selected to provide efficient charging for charging times ranging from 1 minute to 100 hours. In an embodiment, for example, k(t) is selected so as to provide charging voltages having a time dependence different from constant-current, constant voltage charging methods, constant current charging methods, constant voltage charging methods and linear voltammetry charging methods.

In an embodiment, for example, the expression k(t) is provided by Equation I:

$$k(t) = \frac{C}{r_i(t)^n};$$ (Equation I)

wherein C is a constant, $r_i(t)$ is the time rate of current flowing into the electrochemical cell, t is time, and n is greater than 0. In an embodiment, for example, $$r_i = \frac{\partial i(t)}{\partial t};$$

wherein i is the current flowing to the electrochemical cell and t is time. In an embodiment, for example, $r_i(t)$ provides charging voltages having a time dependence different from constant-current, constant voltage charging methods, constant current charging methods, constant voltage charging methods and linear voltammetry charging methods. In an embodiment, for example, C has a value providing charging voltages having a time dependence different from constant-current, constant voltage charging methods, constant current charging methods, constant voltage charging methods and linear voltammetry charging methods. In an embodiment, for example, C has a value providing charging voltages as a function of time selected to provide efficient partial or complete charging for charging times ranging from 1 minute to 100 hours. In an embodiment, for example, n has a value providing charging voltages having a time dependence different from constant-current, constant voltage charging methods, constant current charging methods, constant voltage charging methods and linear voltammetry charging methods. In an embodiment, for example, n has a value providing charging voltages as a function of time selected to provide efficient partial or complete charging for charging times ranging from 1 minute to 100 hours. In an embodiment, for example, $V_0$, $V_{min}$ and $V_{max}$ have values providing charging voltages as a function of time selected to provide efficient partial or complete charging for charging times ranging from 1 minute to 100 hours.

In another aspect, the invention provides a battery charging system comprising: (1) two or more electrodes for making an electrical connection to terminals of an electrochemical cell; (2) a power supply positioned in electrical communication with the two or more electrodes for providing a controllable time varying charging voltage to the two or more electrodes; and (3) a processor for controlling the charging voltage provided by the power supply, wherein the processor provides a time varying charging voltage to the electrochemical cell, thereby generating a charging current resulting in charging of the electrochemical cell; wherein the time varying charging voltage has a non-linear time dependency provided by $V = V_0 \pm k(t)t$ and $V_{min} \leq V \leq V_{max}$; wherein V is the time varying charging voltage, t is time, $V_0$ is an initial voltage, k(t) is a time dependent voltage rate, wherein $V_{min}$ is a minimum voltage and $V_{max}$ is a maximum voltage. The system of this aspect may incorporate hardware (e.g. processor, etc.) and/or software components to implement any of the charging methods described herein, such as using any of the charging voltage and/or charging current parameters, expression or equations as set forth herein. In an embodiment, for example, the processor component includes hardware (e.g. processor, etc.) and/or software components that implements a charging method as described herein.

In an embodiment, for example, the processor controls the charging voltage such that the charging voltage has a rate of change that is not constant for at least a portion of, and optionally all of, the charging process. In an embodiment, for example, the power supply provides a controllable time varying charging current to the two or more electrodes. In an embodiment, for example, the processor controls the charging current such that the charging current has a rate of change that is not constant. In an embodiment, for example, the processor controls the charging voltage and the charging current such that the charging voltage has a rate of change having an inverse relationship with a rate of change of the charging current, for at least a portion of, and optionally all of, the charging process. In an embodiment, for example, the processor controls the charging voltage and the charging current such that a product of a rate of change of the charging voltage and a rate of change of the charging current is constant, for at least a portion of, and optionally all of, the charging process. In an embodiment, for example, the processor controls the charging voltage and the charging current such that the charging voltage has a rate of change having an inverse relationship with a rate of change of the charging current raised to an exponential factor, such as an exponential factor greater than zero. In an embodiment of this aspect, for example, the processor controls the exponential factor so as to partially or completely charge the battery in a selected time.

In another aspect, the invention provides a secondary battery charging controller comprising: a control circuit for controlling a charging voltage provided by a power supply for charging a secondary battery, wherein the control circuit controls the charging voltage to provide a time varying charging voltage to the secondary battery; wherein the time varying charging voltage has a non-linear time dependency provided by $V=V_0 \pm k(t)t$ and $V_{min} \leq V \leq V_{max}$; wherein V is the time varying charging voltage, t is time, $V_0$ is an initial voltage, $k(t)$ is a time dependent voltage rate, wherein $V_{min}$ is a minimum voltage and $V_{max}$ is a maximum voltage. The charging controller of this aspect may incorporate hardware (e.g. processor, etc.) and/or software components to implement any of the charging methods described herein, such as using any of the charging voltage and/or charging current parameters, expression or equations as set forth herein.

The methods and devices of the present invention are useful for charging a range of electrochemical devices, such as electrochemical cells, useful for a range of applications including portable electronics, transportation, aerospace, renewable energy and biomedical applications. In an embodiment, for example, the electrochemical cell is a secondary battery. In an embodiment, for example, the electrochemical cell is a lithium ion battery, a Ni-cadmium battery, a lithium polymer battery, nickel metal hydride battery, or a lead-acid battery.

Without wishing to be bound by any particular theory, there can be discussion herein of beliefs or understandings of underlying principles or mechanisms relating to the invention. It is recognized that regardless of the ultimate correctness of any explanation or hypothesis, an embodiment of the invention can nonetheless be operative and useful.

DETAILED DESCRIPTION OF THE INVENTION

Figure 1:
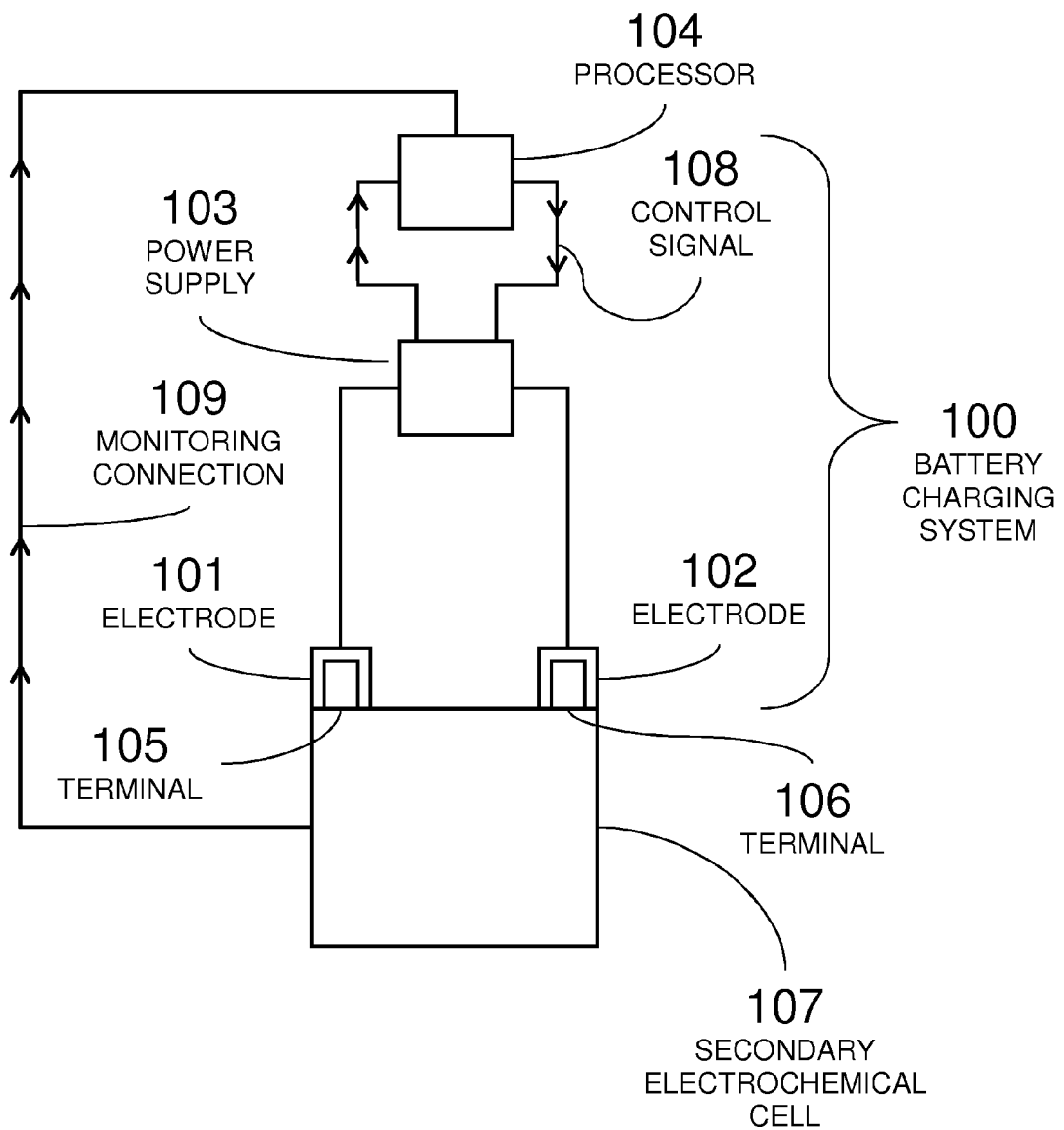
FIG. 1 illustrates a battery charging system of the invention operably connected to a secondary electrochemical cell to provide partial or complete charging.

Referring to the drawings, like numerals indicate like elements and the same number appearing in more than one drawing refers to the same element. In addition, hereinafter, the following definitions apply:

The term "electrochemical cell" refers to devices and/or device components that convert chemical energy into electrical energy or electrical energy into chemical energy. Electrochemical cells have two or more electrodes (e.g., positive and negative electrodes) and an electrolyte, wherein electrode reactions occurring at the electrode surfaces result in charge transfer processes. Electrochemical cells include, but are not limited to, primary batteries, secondary batteries and electrolysis systems. General cell and/or battery construction is known in the art, see e.g., U.S. Pat. Nos. 6,489,055, 4,052, 539, 6,306,540, Seel and Dahn J. Electrochem. Soc. 147(3) 892-898 (2000).

The term "capacity" is a characteristic of an electrochemical cell that refers to the total amount of electrical charge an electrochemical cell, such as a battery, is able to hold. Capacity is typically expressed in units of ampere-hours. The term "specific capacity" refers to the capacity output of an electrochemical cell, such as a battery, per unit weight. Specific capacity is typically expressed in units of ampere-hours $kg^{-1}$.

The term "discharge rate" refers to the current at which an electrochemical cell is discharged. Discharge current can be expressed in units of ampere-hours. Alternatively, discharge current can be normalized to the rated capacity of the electrochemical cell, and expressed as $C/(X t)$, wherein C is the capacity of the electrochemical cell, X is a variable and t is a specified unit of time, as used herein, equal to 1 hour.

Electrode refers to an electrical conductor where ions and electrons are exchanged with electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species. Positive electrodes and negative electrodes of the present electrochemical cell may further comprises a conductive diluent, such as acetylene black, carbon black, powdered graphite, coke, carbon fiber, and metallic powder, and/or may further comprises a binder, such polymer binder. Useful binders for positive electrodes in some embodiments comprise a fluoropolymer such as polyvinylidene fluoride (PVDF). Positive and negative electrodes of the present invention may be provided in a range of useful configurations and form factors as known in the art of electrochemistry and battery science, including thin electrode designs, such as thin film electrode configurations. Electrodes are manufactured as disclosed herein and as known in the art, including as disclosed in, for example, U.S. Pat. Nos. 4,052, 539, 6,306,540, 6,852,446. For some embodiments, the electrode is typically fabricated by depositing a slurry of the electrode material, an electrically conductive inert material, the binder, and a liquid carrier on the electrode current collector, and then evaporating the carrier to leave a coherent mass in electrical contact with the current collector.

"Electrode potential" refers to a voltage, usually measured against a reference electrode, due to the presence within or in contact with the electrode of chemical species at different oxidation (valence) states.

"Electrolyte" refers to an ionic conductor which can be in the solid state, the liquid state (most common) or more rarely a gas (e.g., plasma).

"Charging voltage" refers to a voltage applied to an electrochemical device, such as a secondary electrochemical cell, to charge the electrochemical device.

"Charging current" refers to a current applied to an electrochemical device, such as a secondary electrochemical cell, to charge the electrochemical device.

FIG. 1 illustrates a battery charging system of the invention operably connected to a secondary electrochemical cell to provide partial or complete charging. Battery charging system 100 comprises electrodes 101 and 102 positioned in electrical communication with power supply 103 and, optionally processor 104. Electrodes 101 and 102 are positioned to make electrical connections with terminals 105 and 106 of the secondary electrochemical cell 107, such as a lithium ion battery. Power supply 103 is a controllable power supply and receives one or more control signals 108 from processor 104 for controlling a time varying charging voltage provided between electrodes 101 and 102. The charging voltage provided by power supply 103 generates a charging current capable of partially or fully charging secondary electrochemical cell 107, optionally over a preselected charging time. Processor 104 controls a charging voltage provided by power supply 103 to electrochemical cell as a function of time. In a specific embodiment, for example, Processor 104 controls a charging voltage provided by power supply 103 to electrochemical cell according to $V=V_0 \pm k(t)t$ and $V_{min} \leq V \leq V_{max}$; wherein V is a time varying charging voltage, t is time, $V_0$ is an initial voltage and k(t) is a time dependent voltage rate wherein $V_{min}$ is a minimum voltage and $V_{max}$ is a maximum voltage. Optionally, k(t) is a function of a charging current provided by power supply 103 to electrochemical cell 107.

Optionally, processor 104 also monitors, measures or otherwise receives an input of one or more parameters relating to secondary electrochemical cell 107 over one or more monitoring connections 109 operably connected secondary electrochemical cell 107. In an embodiment, for example, processor 104 determines, or is provided an input, one or more parameters corresponding to the electrochemical cell, such as the state of health, state of charge, cycle history, composition and/or health of anode, composition and/or health of cathode, composition and/or health of the electrolyte or cell temperature of secondary electrochemical cell 107. Optionally, processor 104 controls a charging voltage provided by power supply 103 to electrochemical cell 107 based on one or more parameters of electrochemical cell 107. Optionally, processor 104 measures a charging voltage provided to electrochemical cell 107. Optionally, processor 104 measures a charging current provided to electrochemical cell 107. Optionally, processor 104 controls a charging voltage provided by power supply 103 to electrochemical cell 107 based on a charging current provided to electrochemical cell 107. Optionally, processor 104 controls a charging voltage provided by power supply 103 to electrochemical cell 107 based on the total charge provided to electrochemical cell 107 by power supply 103.

Figure 2:
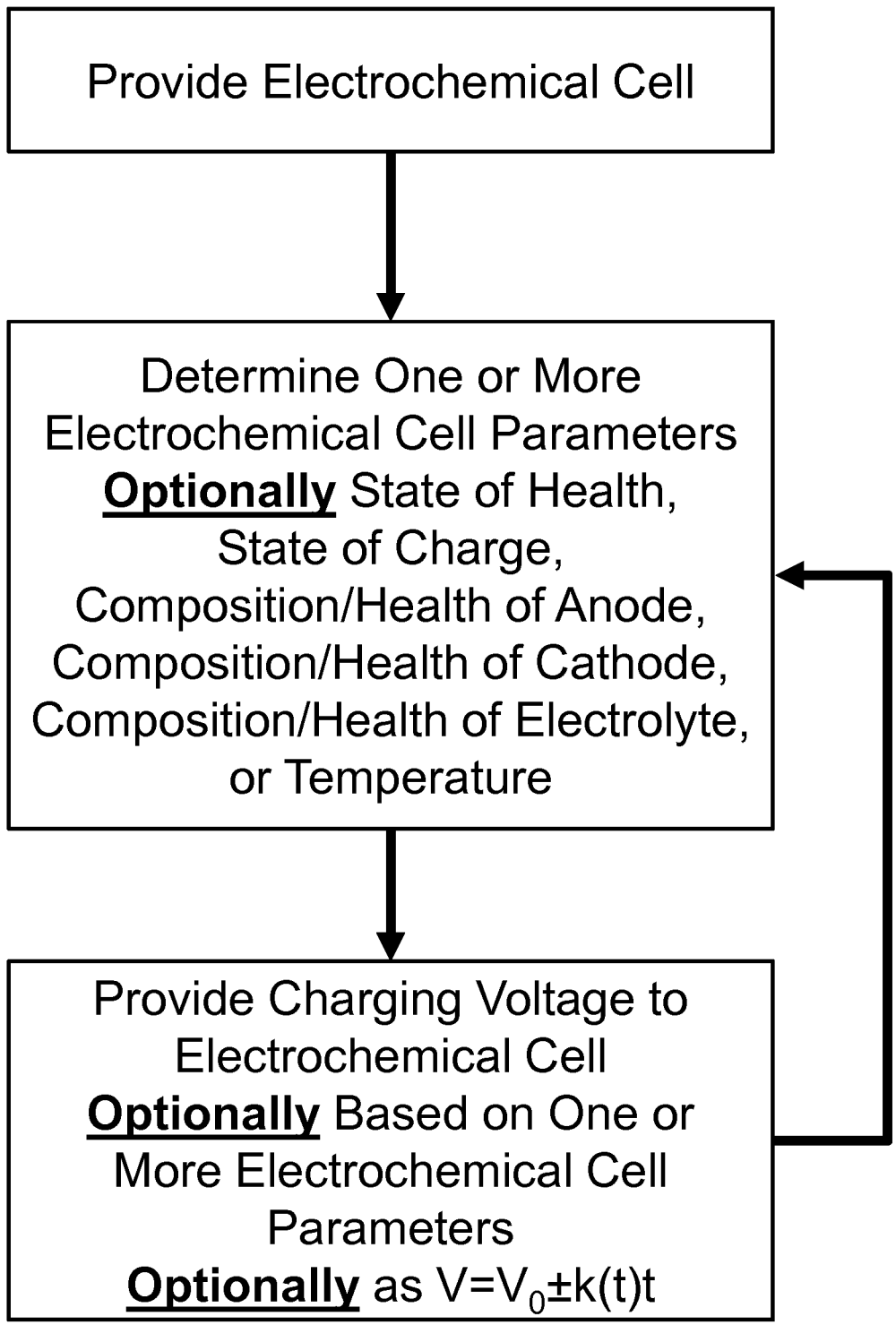
FIG. 2 provides an overview of a method of charging an electrochemical cell.

FIG. 2 provides an overview of a method of charging an electrochemical cell of the invention. Initially, an electrochemical cell is provided, for example an electrochemical cell in a partially or completely discharged state: Next, one or more parameters of the electrochemical cell are determined, such as state of health, state of charge, composition and/or health of the anode, composition and/or health of the cathode, composition and/or health of the electrolyte, cycling history or cell temperature. Next, a charging voltage is provided to the electrochemical cell, thereby generating thereby generating a charging current resulting in charging of said electrochemical cell, for example a time varying charging current. Optionally, the charging voltage provided to the electrochemical cell as a function of time is based on one or more of the parameters of the electrochemical cell, for example as determined by, or provided as input to, a charging controller or processor. Optionally, the charging voltage provided to the electrochemical cell is based on a charging current provided to the electrochemical cell. Optionally, the charging voltage provided to the electrochemical cell is based on the total charge provided to the electrochemical cell or the initial discharged state of the electrochemical cell. Optionally, the step of determining the one or more parameters of the electrochemical cell is repeated and the charging voltage provided to the electrochemical cell is controlled based on one or more of the newly determined parameters.

EXAMPLE 1

Battery Charging System

Lithium ion batteries are commonly charged using the constant-current, constant-voltage (CCCV) method. In this method, for example, the battery charger controls applied constant current and final voltage, optionally together with some battery safety parameters such as temperature and overcharge currents and voltages. In addition, some chargers or methods may take into account the battery cycle life to adjust the CCCV conditions. Occasionally linear voltammetry (LV) is applied to charge and discharge batteries. In such technique, applied voltage V varies linearly with time:

$$V=V_0 \pm kt, \text{ and } V_{min} \leq V \leq V_{max};$$

wherein $V_0$=starting voltage, t is time, k=constant and $V_{min}$=minimum voltage, $V_{max}$=maximum voltage.

The conventional CCCV procedure, however, does not take into account the battery state of health (SOH) resulting in premature battery aging and irreversible losses in stored energy upon cycling. Using cycle life as metrics to change the CCCV parameters helps gain in cycle life but only to a limited extent. In addition, CCCV is not a "natural way" to charge batteries because of the nonlinearity of the current response to a voltage change.

The present invention provides systems and methods to charge batteries in a different way than CCCV and LV that take into account the battery current response to changes in the applied voltage. In an embodiment, for example, nonlinear voltammetry (NLV) is used for charging, where the rate of voltage change (k in V/s) is not a constant and varies with time. For some applications, NLV can be described in terms of the equation: $V=V_0 \pm k(t)t$, $V_{min} \leq V \leq V_{max}$, wherein, t is time, $V_0$ is a starting voltage, k(t) is a time dependent voltage rate (V/s), $V_{min}$ is a minimum voltage, and $V_{max}$ is a maximum voltage.

In some embodiments, the invention provides a NLV battery charging method; wherein the time dependent voltage rate k(t) is fixed according to different criteria such as The time rate "$r_i$" of current flowing in the cell, i(A) as defined by the equation:

$$r_i = \frac{\partial i(t)}{\partial t};$$

and

The relationship between k(t) and $r_i$ is:

$$k(t) \times r_i^n = \text{constant};$$

where n is an adjustable parameter and wherein n>0.

This equation fixes the voltage rate k(t) to the current rate $r_i$ so as k(t) and $r_i$ vary in opposite ways, i.e. k(t) increases when $r_i$ decreases. In this equation, parameter n is adjusted to allow for a full battery charge in a preselected time according to the user.

The methods of the invention may be implemented via software or hardware (e.g., processor, etc.) embodiments. In some embodiments, the charging parameters (e.g. charging voltage, charging current, etc.) are adjusted to meet certain the battery charge criteria: battery type, cycle history, total charging time; voltage limits; current limits; enhance charge capacity and cycle life.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure.

Whenever a range is given in the specification, for example, a voltage range, a current range, a temperature range, a time range, or a composition or concentration range, all intermediate ranges and subranges, as well as all individual values included in the ranged given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

I claim:

1. A method of charging an electrochemical cell, the method comprising the steps of:
providing the electrochemical cell; and
providing a time varying charging voltage to said electrochemical cell, thereby generating a charging current resulting in charging of said electrochemical cell; wherein said time varying charging voltage has a non-linear time dependency provided by $V=V_0 \pm k(t)t$ and $V_{min} \leq V \leq V_{max}$; wherein V is the time varying charging voltage, t is time, $V_0$ is an initial voltage, k(t) is a time dependent voltage rate, $V_{min}$ is a minimum voltage and $V_{max}$ is a maximum voltage.

2. The method of claim 1, further comprising the step of determining the state of health of the electrochemical cell, the state of charge of the electrochemical cell, the composition of the positive electrode of the electrochemical cell, the composition of the negative electrode of the electrochemical cell, the composition of the electrolyte of the electrochemical cell or any combination of these; wherein said non-linear time dependency is derived, at least in part, from said state of health of the electrochemical cell, said state of charge of the electrochemical cell, said composition of the positive electrode, said composition of the negative electrode, said composition of the electrolyte or any combination of these.

3. The method of claim 1, wherein said charging voltage has a rate of change that is not constant.

4. The method of claim 1, wherein said charging current has a non-linear time dependency.

5. The method of claim 1, wherein said charging voltage has a rate of change having an inverse relationship with a rate of change of said charging current.

6. The method of claim 5, wherein a product of said rate of change of said charging voltage and said rate of change of said charging current is constant.

7. The method of claim 1, wherein said charging voltage has a rate of change having an inverse relationship with a rate of change of said charging current raised to an exponential factor.

8. The method of claim 7, wherein said exponential factor is greater than zero.

9. The method of claim 7, further comprising a step of selecting said exponential factor to charge said electrochemical cell in a selected time.

10. The method of claim 1, wherein k(t) provides charging voltages as a function of time selected to provide efficient charging for charging times ranging from 1 minute to 100 hours.

11. The method of claim 1, wherein k(t) provides charging voltages having a time dependence different from constant-current, constant voltage charging methods, constant current charging methods, constant voltage charging methods and linear voltammetry charging methods.

12. The method of claim 11, wherein k(t) is provided by the expression:

$$k(t) = \frac{C}{r_i(t)^n};$$

wherein C is a constant, $r_i(t)$ is the time rate of current flowing into the electrochemical cell, t is time and n is greater than 0.

13. The method of claim 12, wherein C has a value providing charging voltages having a time dependence different from constant-current, constant voltage charging methods, constant current charging methods, constant voltage charging methods and linear voltammetry charging methods.

14. The method of claim 12, wherein C has a value providing charging voltages as a function of time selected to provide efficient charging for charging times ranging from 1 minute to 100 hours.

15. The method of claim 12, wherein $r_i(t)$ provides charging voltages having a time dependence different from constant-current, constant voltage charging methods, constant current charging methods, constant voltage charging methods and linear voltammetry charging methods.

16. The method of claim 12, wherein n has a value providing charging voltages having a time dependence different from constant-current, constant voltage charging methods, constant current charging methods, constant voltage charging methods and linear voltammetry charging methods.

17. The method of claim 12, wherein n has a value providing charging voltages as a function of time selected to provide efficient charging for charging times ranging from 1 minute to 100 hours.

18. The method of claim 1, wherein $V_0$, $V_{min}$ and $V_{max}$ have values providing charging voltages as a function of time selected to provide efficient charging for charging times ranging from 1 minute to 100 hours.

19. The method of claim 1, wherein said charging voltage is provided to said electrochemical cell over a charging time selected from the range of 1 minute to 100 hours.

20. The method of claim 1, wherein said electrochemical cell is a secondary battery.

21. The method of claim 1, wherein said electrochemical cell is a lithium ion battery, a Ni-cadmium battery, a lithium polymer battery, nickel metal hydride battery, or a lead-acid battery.

22. A battery charging system comprising:
two or more electrodes for making an electrical connection to terminals of an electrochemical cell;
a power supply positioned in electrical communication with said two or more electrodes for providing a controllable time varying charging voltage to said two or more electrodes; and
a processor for controlling said charging voltage provided by the power supply, wherein said processor provides a time varying charging voltage to said electrochemical cell, thereby generating a charging current resulting in charging of said electrochemical cell; wherein said time varying charging voltage has a non-linear time dependency provided by $V=V_0 \pm k(t)t$ and $V_{min} \leq V \leq V_{max}$; wherein V is the time varying charging voltage, t is time, $V_0$ is an initial voltage, k(t) is a time dependent voltage rate, $V_{min}$ is a minimum voltage and $V_{max}$ is a maximum voltage.

23. The system of claim 22, wherein said processor controls said charging voltage such that said charging voltage has a rate of change that is not constant.

24. The system of claim 22, wherein said power supply provides a controllable time varying charging current to said two or more electrodes.

25. The system of claim 22, wherein said processor controls said charging current such that said charging current has a rate of change that is not constant.

26. The system of claim 22, wherein said processor controls said charging voltage and said charging current such that said charging voltage has a rate of change having an inverse relationship with a rate of change of said charging current.

27. The system of claim 22, wherein said processor controls said charging voltage and said charging current such that a product of a rate of change of said charging voltage and a rate of change of said charging current is constant.

28. The system of claim 22, wherein said processor controls said charging voltage and said charging current such that said charging voltage has a rate of change having an inverse relationship with a rate of change of said charging current raised to an exponential factor.

29. The system of claim 28, wherein said exponential factor is greater than zero.

30. The system of claim 28, wherein said processor controls said exponential factor so as to charge said battery in a selected time.

31. A secondary battery charging controller comprising:
a control circuit for controlling a charging voltage provided by a power supply for charging a secondary battery, wherein said control circuit controls said charging voltage to provide a time varying charging voltage to said electrochemical cell, thereby generating a charging current resulting in charging of said electrochemical cell; wherein said time varying charging voltage has a non-linear time dependency provided by $V=V_0 \pm k(t)t$ and $V_{min} \leq V \leq V_{max}$; wherein V is the time varying charging voltage, t is time, $V_0$ is an initial voltage, k(t) is a time dependent voltage rate, $V_{min}$ is a minimum voltage and $V_{max}$ is a maximum voltage.

* * * * *